3,193,535
POLYMERIZATION OF AQUEOUS SOLUTIONS OF POLYAMIDE-FORMING REACTANTS WITH A CONTINUOUSLY DECREASING PRESSURE
John Anthony Carter, Newport, England, assignor to British Nylon Spinners Limited, Pontypool, Monmouthshire, England
No Drawing. Filed Feb. 1, 1962, Ser. No. 170,503
Claims priority, application Great Britain, Feb. 28, 1961, 7,279/61
6 Claims. (Cl. 260—78)

The present invention relates to the manufacture of high molecular weight linear polyamides by the condensation polymerisation of monomers which are polymethylene diammonium salts of dibasic alipratic acids or which are omega-amino aliphatic carboxylic acids, and more particularly to a continuous process for carrying out said polymerisation.

The expression "high molecular weight linear polyamides" is intended to signify that the degree of polymerisation of the polyamides is sufficiently great for them to be capable of being melt-spun into filaments. This degree of polymerisation is reached when at least about 90–95% of the theoretical total water of chemical condensation, i.e. of the maximum water theoretically available, has been eliminated by the condensation reaction.

As compared with a batch process or discontinuous process for polymerising the above-mentioned monomer salts or amino acids, for example, hexamethylene diammonium adipate, a continuous process offers a number of advantages, both economic and technical, for instance, the production of a polyamide of uniform high quality. Numerous attempts have accordingly been made to design a continuous process satisfactory for this purpose, and many proposals are to be found in the prior art including multi-stage processes wherein, for example, the major portion of the salt is converted to polyamide under temperature pressure conditions which prevent the formation of steam.

It has now been found, rather unexpectedly, that the condensation polymerisation in question can be successfully accomplished in one stage or nearly in one stage by pumping a strong aqueous solution of the salt or amino acid through a long narrow tube heated to polymerisation temperatures wherein the pressure is super-atmospheric, amounting to at least 14 atmospheres at the entry end thereof, and continuously decreases along the tube until at the exit end thereof it becomes substantially atmospheric or sub-atmospheric, but it is essential that the pressure be always low enough to permit the evolution of steam at the existing temperature. The word "continuously" means that there must be no abrupt or sudden fall in pressure along the tube. In other words the value of the pressure at any point in the tube constitutes a continuous monotonic single-value function of the distance of said point along the tube. The expression "substantially atmospheric" signifies that the pressure in question need not correspond precisely with that of the atmosphere but may differ therefrom by a small amount such as that due to a water seal or column of liquid reagent, for instance. Such small pressure differences can be assumed to be of the order of a few percent of an atmosphere. It will be apparent from the conditions of temperature and pressure just prescribed that steam is always present as a separate phase during the polymerisation in the tube. The steam is derived from the solvent water of the aqueous monomer solution and from the water evolved in the condensation polymerisation reaction.

The degree of polymerisation attained by the polyamide issuing from the narrow tube depends especially though not solely on the temperature and time of passage through the tube and should correspond to the elimination of at least 90% of the total theoretical water of chemical condensation. In the case of polyhexamethylene adipamide the degree of polymerisation of the polyamide coming from the tube is preferably at least 72, the figure 72 corresponding to the elimination of 98½ % of the water of condensation. Such a polyamide can be melt-spun into commercially useful textile filaments. The time of passage of the polymerising material through the tube is conveniently controlled by suitably adjusting the rate at which the monomer solution is pumped into the said tube. If desired, the degree of polymerisation of the polyamide issuing from the tube can be increased by further heating in one or more other vessels maintained at polymerisation temperatures, but it is to be noted that usually little or no further polymerisation is needed.

In the present process, as already mentioned, the pressure at the exit end of the narrow tube, after falling therealong, attains a value which is substantially atmospheric or subatmospheric. This necessary fall of pressure is accomplished by an appropriate release of steam at the exit end of the tube. On release of the steam, the polyamide issuing from the tube, if polymerised to the required degree, can be directly melt-spun into filaments. On the other hand, if further polymerisation of the polyamide coming from the tube is desirable, this can be accomplished in one or more other vessels, as indicated above, and the resulting polymer then continuously melt-spun into filaments.

The present process is commercially advantageous not only on account of the compactness and simplicity of the apparatus employed which comprises essentially a heated tube, but also because tubes of relatively small manufacturing capacity can be operated efficiently. This is important, for example, when a range of pigmented polyamides is required. The purity of the polyamides produced is moreover remarkably high even after they have been melt-spun into filaments. This high purity is supposedly ascribable to the relatively short time the polyamide has existed in the molten state before becoming a filament, for it is well known that polyamides maintained in a molten condition gradually degrade to a greater or lesser extent despite every care to exclude oxygen.

Accordingly the present invention consists of a continuous process for the manufacture of high molecular weight linear polyamides by the condensation polymerisation of a monomer which is a polymethylene diammonium salt of an aliphatic alpha, omega-diacarboxylic acid containing from 8 to 24 carbon atoms or which is an omega-amino aliphatic carboxylic acid containing from 6 to 12 carbon atoms, comprising pumping an aqueous solution of said monomer into the entry end of a long narrow tube heated to polymerisation temperatures so that the material polymerises as it passes through the tube, wherein the pressure is at least 14 atmospheres at the entry end of said tube, continuously decreases along the tube and falls to substantially atmospheric or sub-atmospheric pressure at the exit end of said tube but always permits the evolution of steam which is derived from the aqueous solution or the water of condensation, and at any point in the tube has value consitituting a continuous monotonic single-value function of the distance of said point along the tube, the rate of passage of the polymerising material through the tube being such that a least 90% of the total theoretical water of chemical condensation is evolved during said passage, and optionally further heating the material issuing from the exit end of the tube to complete the polymerisation of the polyamide.

The invention includes melt-spinning the above polyamides into filaments, films, ribbons and like shaped objects and the said objects when so melt-spun.

Examples of suitable polymethylene diammonium salts and omega amino acids for use in the present process are the following:

Hexamethylene diammonium adipate
Hexamethylene diammonium sebacate
Octamethylene diammonium adipate
Decamethylene diammonium adipate
Pentamethylene diammonium sebacate
Dodecamethylene diammonium adipate
Omega-amino caproic acid
Omega-amino undecanoic acid A strong aqueous solution of the monomer is desirably employed and to increase the solubility of the monomer, the solution can be heated. In the case of hexamethylene diammonium adipate salt, for example, 70 parts by weight of salt are soluble in 30 parts by weight of water, so as to constitute a solution containing 70% by weight of salt, at 111° C.

By the phrase "narrow tube" is to be understood a tube having an internal diameter not exceeding 2.5 cm. A suitable diameter is 1.2 cm. The diameter of the tube need not be uniform; it can increase from the inlet towards the outlet. Moreover the tube may possess any convenient shape, e.g. a spiral positioned vertically or horizontally. The vertical spiral can be traversed by the polymerising mass in an upward or downward direction. The material of which the tube is constructed is conveniently one not subject to corrosion by the polymerising mass and may be, for instance, stainless steel. The tube must be capable of withstanding a high pressure which may, for example reach 28 atmospheres at the entry end. The other tube or vessel into which the aforesaid narrow tube leads, can take the form of a tube of larger internal diameter or else may constitute a vessel in which the molten polymer collects under atmospheric pressure, and from which it is melt-spun into filaments or drawn off for use as required.

For making a given polyamide it is found in practice that a temperature at least 10° C. above the melting point of the polyamide can be regarded as a suitable polymerisation temperature i.e. a temperature at which amide-formation proceeds at a useful rate, provided it be not too high otherwise degradation of the polyamide is likely to occur. The temperature of the polymerising material is preferably not allowed to fall as it passes through the narrow tube. It is convenient that the whole tube be surrounded by heating means e.g. a jacket of hot fluid, at one uniform temperature. The temperature in the case of polyhexamethylene adipamide is advantageously from 285° C. to 290° C.

The rate of pumping should be adjusted so that the polymerising material is submitted to polymerising temperatures for a period of at least 5 minutes and preferably from 30 to 60 minutes. The pressure at the entry end of the tube is preferably between 28 and 34 atmospheres. All pressures quoted are absolute.

In the present process of manufacture of polyamides there may be included in the reaction mixture monofunctional compounds in small quantity, notably monoamines or monobasic acids, e.g. acetic acid, in order to prevent polymerisation proceeding beyond the desired degree at elevated temperatures, for example, when the polyamide is held molten for the purpose of melt-spinning. Such monofunctional compounds are known as viscosity stabilisers. Other adjuvants may also be added at any convenient stage of the process, for instance: dyes, pigments, dyestuff formers, heat stabilisers, light stabilisers, plasticisers, delustrants, polyamide and other resins.

The following examples, in which the parts and the percentages are by weight, are intended to illustrate, not limit, the invention:

*Example 1*

An aqueous solution, containing 47% of hexamethylene diammonium adipate salt and 0.55% of hexamethylene diamine, is pumped through a narrow coiled tube maintained at 285° C. The tube which is fabricated of steel consists of 18 metres of internal diameter 6 mm. followed by 18 metres of internal diameter 9 mm., 30 metres of internal diameter 1.25 cm. and 22.5 metres of internal diameter 2.5 cm. The pumping rate is such that 3.4 kilograms of molten polyamide issue from the exit end of the tube per hour, the pressure at the entry amounting to 26 atmospheres. The time of the polymerisation reaction is 47 minutes. The resulting polymer has a relative viscosity (as defined below) of 36. It is suitable for melt-spinning into textile filaments.

The relative viscosity of a polyamide is defined as the ratio of the viscosity of an 8.4% (solute:solution) solution thereof in 90% (solute:solution) aqueous formic acid to the viscosity of the said aqueous formic acid at the same temperature.

*Example 2*

An aqueous solution, containing 47% of omega-amino caproic acid, is pumped at a rate of 120 gm. per minute through a narrow coiled tube maintained at 280° C. The tube which is fabricated of austenitic steel, consists of 18 metres of internal diameter 5 mm. followed by 18 metres of internal diameter 7 mm., 30 metres of internal diameter 1.0 cm. and 8 metres of internal diameter 2.1 cm. The pressure at the entry end is 18 atmospheres. The reaction time is 35 minutes. Polymers with a relative viscosity of 24 issues from the exit end of the tube at 30 gm. per minute. The steam leaving the tube contains caprolactam.

*Example 3*

A 47% aqueous solution of omega-amino caproic acid is pumped at a rate of 60 gm. per minute through a narrow coiled tube maintained at 260° C. The tube, which is made of austenitic steel consists of 18 metres of internal diameter 5 mm. followed by 18 metres of internal diameter 7 mm., 30 metres of internal diameter 1.0 cm. and 8 metres of internal diameter 2.1 cm. The pressure at the entry end is 14 atmospheres. The reaction time is 95 minutes. Polymer having a relative viscosity of 26 is produced at a rate of 20 gm. per minute. The steam issuing from the tube contains caprolactam.

*Example 4*

An aqueous mixture containing 44% of hexamethylene diammonium adipate salt, 0.93% of hexamethylene diamine, 0.12% of acetic acid and 9% of aqueous titanium dioxide, is pumped at a rate of 170 gm. per minute through a narrow coiled tube maintained at 290° C. The aqueous titanium dioxide is made by dispersing 1 part of finely divided anatase in 9 parts of a 42% aqueous dispersion of polyhexamethylene adipamide, said polyamide having a degree of polymerisation of 1.28. The tube which is fabricated of austenitic steel consists of 18 metres of internal diameter 6 mm. followed by 18 metres of internal diameter 9 mm., 30 metres of internal diameter 1.25 cm. and 22.5 metres of internal diameter 2.1 cm. The pressure at the entry end of the tube is 29 atmospheres. The reaction time is 31 minutes. The resulting polymer has a relative viscosity of 34 and is suitable for melt-spinning into textile filaments.

*Example 5*

An aqueous mixture containing 47% of hexamethylene diammonium adipate, 0.49% hexamethylene diamine, 0.1% of elementary iodine and 0.01% of cupric acetate is pumped at a rate of 140 gm. per minute through a narrow coiled tube maintained at 290° C. The tube which is fabricated of austenitic steel consists of 18 metres of internal diameter 5 mm. followed by 18 metres of internal diameter 7 mm., 30 metres of internal diameter 1.0 cm. and 22.5 metres of internal diameter 2.1 cm. The pressure at the entry end of the tube is 26 atmospheres. The reaction time in the tube is 43 minutes. The resulting polymer has a relative viscosity of 48 and is sutable for melt-spinning into filaments.

*Example 6*

An aqueous solution containing 47% of hexamethylene diammonium adipate salt and 1.12% of hexamethylene diamine is pumped into a narrow coiled tube maintained at 285° C. The coil which is fabricated of austenitic steel consists of 18 metres of internal diameter 5 mm. followed by 18 metres of internal diameter 7 mm. The pumping rate is such that 37 gm. per minute of polymer issue from the tube, the pressure at the entry end amounting to 18 atmospheres. The time of reaction is 7 minutes. The resulting polymer has a relative viscosity of 11.4. It is not suitable for melt-spinning into textile filaments without further polymerization.

*Example 7*

An aqueous solution containing 47.5% of hexamethylene diammonium adipate salt and 0.74% of hexamethylene diamine is pumped through a narrow coiled tube maintained at 290° C. by a jacket of vapour from a eutectic mixture of diphenyl and diphenyl oxide boiling under superatmospheric pressure. The tube, which is fabricated of austenitic steel, consists of 18 metres of internal diameter 5 mm. followed by 18 metres of internal diameter 7 mm., 30 metres of internal diameter 1.0 cm. and 8 metres of internal diameter 2.1 cm. The pressure at the entry end is 21 atmospheres and the reaction time in the tube is 28 minutes. The exit end of the tube leads into the top of a vertical cylindrical vessel, 30 cm. in diameter and 60 cm. in height, which is also maintained at 290° C. and of which the internal pressure is 450 mm. mercury. The polymer which enters this vessel from the tube is pumped out so that it remains for as short a time as possible in the vessel. In other words the pool of molten polymer in the cylindrical vessel is kept as small as possible. The resulting polymer, which is discharged at a rate of 55 gm. per minute has a relative viscosity of 36.8.

*Example 8*

Example 7 is repeated, except that a larger pool of molten polymer is maintained in the cylindrical vessel, so that the time of residence of the polymer in this vessel is 23 minutes. The relative viscosity of the resulting polymer is 40.5.

*Example 9*

Example 7 is repeated save that the aqueous solution contains 47% of hexamethylene diammonium adipate, 0.49% of hexamethylene diamine and 0.13% of acetic acid and the pressure at the entry end of the tube is 26 atmospheres. Also the final portion of the tube of internal diameter 2.1 cm. is 22.5 metres long instead of 8 metres. Moreover the polymer is pumped from the subsequent vessel at 56 gm. per minute. The relative viscosity of the polymer is 31.7.

*Example 10*

An aqueous mixture containing approximately 47% of hexamethylene diammonium adipate, 0.47% hexamethylene diamine and 0.13% acetic acid is pumped through a narrow coiled tube maintained at 290° C. by a jacket of vapour from a eutectic mixture of diphenyl and diphenyl oxide. The tube is the same as that of Example 7, and the pressure at its entry is 26 atmospheres. The reaction time is 43 minutes. The exit end of the tube leads into the top of a vessel (as described in Example 7) also maintained at 290° C., of which the internal pressure is substantially atmospheric. The polymer which enters this vessel from the tube is pumped out, after remaining there for 17 minutes, to 4 spinnerets at a rate of 55 gm. per minute, where it is extruded as 13 filaments and wound up at a speed of 1250 metres per minute. The yarn has a relative viscosity 34.3 and is drawn at a ratio of 3.12. The drawn yarn has a denier of 40.7, a tenacity of 4.8 gm. per denier and an extensibility at break of 29%.

*Example 11*

Example 10 is repeated, except that the aqueous mixture contains 0.49% hexamethylene diamine instead of 0.47% and the temperature of the narrow tube and vessel is 284° C. instead of 290° C. Similar yarn is obtained.

*Example 12*

Example 10 is repeated except that the aqueous mixture contains 0.51% hexamethylene diamine and the pressure at the entry of the narrow tube is 27 atmospheres. The reaction time in the tube is, however, 45 minutes, and the time of residence in the subsequent vessel 23 minutes. The polymer is pumped from this vessel at a rate of 53 gm. per minute to 2 spinnerets whence it is extruded as 34 filaments and wound up at 250 metres per minute. The yarn of relative viscosity 44, is drawn at a ratio of 5.32. The drawn yarn, of denier 213, has a tenacity of 8 gm. per denier and an extensibility at break of 15.7%.

*Example 13*

An aqueous mixture containing 44% of hexamethylene diammonium adipate salt, 0.93% of hexamethylene diamine, 0.24% of acetic acid and 9% of aqueous carbon black is pumped at a rate of 170 gm. per minute through a narrow coiled tube maintained at 290° C. The aqueous carbon black is made by dispersing 1 part of finely divided carbon in 9 parts of a 42% aqueous dispersion of polyhexamethylene adipamide, said polyamide having a degree of polymerisation of 1.28. The tube which is fabricated of austenitic steel consists of 18 metres of internal diameter 5 mm. followed by 18 metres of internal diameter 7 mm., 30 metres of internal diameter 1.0 cm. and 22.5 metres of internal diameter 2.1 cm. The pressure at the entry end of the tube is 29 atmospheres. The polymerisation reaction time in the tube is 31 minutes. The resulting polymer has a relative viscosity of 31 and is suitable for melt-spinning into textile filaments.

What I claim is:

1. A continuous process for the manufacture of high molecular weight linear polyamides by the condensation polymerization of a monomer which is selected from the group consisting of omega-amino aliphatic carboxylic acids containing from 6 to 12 carbon atoms and polymethylene diammonium salts of aliphatic alpha,omega-dicarboxylic acids containing from 8 to 24 carbon atoms, which process comprises pumping an aqueous solution of said monomer into the entry end of an elongated tubular zone having an internal diameter not exceeding 2.5 cm. and heated to a temperature at least 10° C. above the melting point of the polyamide which causes the polyamide forming reactant to polymerize as it passes therethrough, regulating the pressure in said zone so that it is at least 14 atmospheres at the entry end of said zone, continuously decreases along the zone and falls to a value not substantially above atmospheric pressure at the exit end of said zone while always permitting the evolution of steam, and at any point in the zone has a value constituting a continuous monotonic single-value function of the distance of said point along the zone and passing the polyamide forming reactant through the zone for a period of time sufficient to cause at least 90% of the total theoretical water of chemical condensation to be evolved during said passage, and continuously removing steam and polyamide from the exit end of said zone.

2. The process of claim 1, wherein the temperature of the polymerizing material remains constant as it passes from the entry end to the exit end of the zone.

3. The process of claim 1, wherein the whole of the zone is at one uniform polymerization temperature.

4. The process of claim 1, wherein the monomer is hexamethylene diammonium adipate and the polymerization temperature from 285° to 290° C.

5. The process of claim 4, wherein the pressure at the entry end of the zone is between 28 and 34 atmospheres.

6. The process of claim 1 wherein the polyamide issuing from the exit end of the zone is further heated to above the melting point of said polyamide to complete the polymerization.

References Cited by the Examiner

UNITED STATES PATENTS

| 2,163,636 | 6/39 | Spanagel | 260—78 |
| 2,361,717 | 10/44 | Taylor | 260—78 |
| 2,689,839 | 9/54 | Heckert | 260—78 |

FOREIGN PATENTS 674,954  7/52  Great Britain.

WILLIAM H. SHORT, *Primary Examiner.*
LOUISE P. QUAST, *Examiner.*